Oct. 15, 1963      H. C. CLISSET      3,106,850
MAGNETIC FLUID TRANSMISSION MEANS
Filed July 19, 1961      2 Sheets-Sheet 1
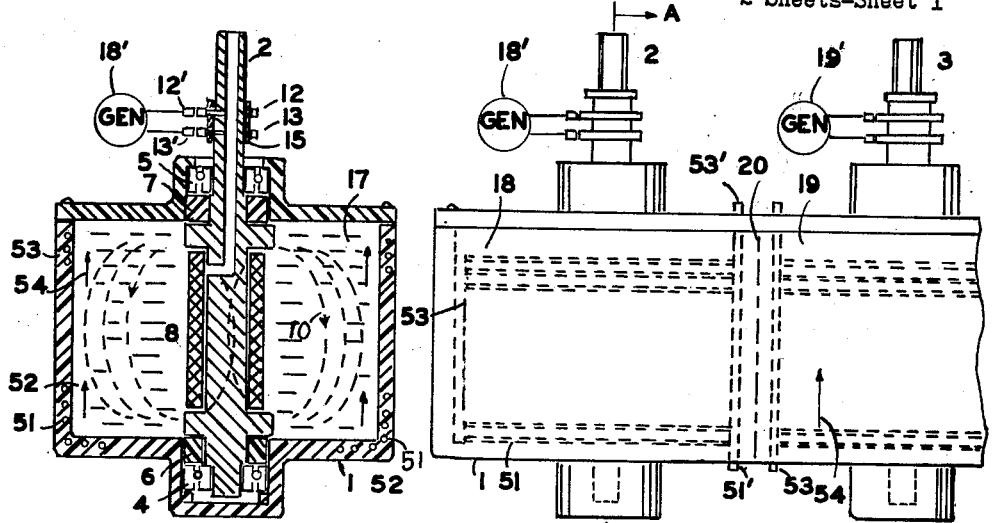
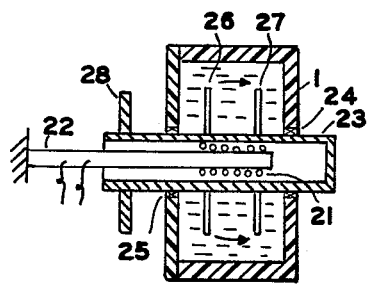
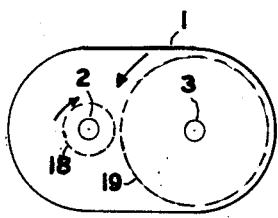
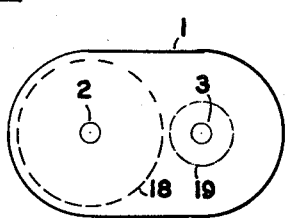
INVENTOR.
HAROLD C. CLISSET
BY *James P. Malone*

Oct. 15, 1963  H. C. CLISSET  3,106,850
MAGNETIC FLUID TRANSMISSION MEANS
Filed July 19, 1961  2 Sheets-Sheet 2

INVENTOR.
HAROLD C. CLISSET
BY *James P. Malone*

United States Patent Office 3,106,850
Patented Oct. 15, 1963

3,106,850
MAGNETIC FLUID TRANSMISSION MEANS
Harold C. Clisset, 25 Violet Lane, Commack, N.Y.
Filed July 19, 1961, Ser. No. 125,114
11 Claims. (Cl. 74—190)

This invention relates to transmission means and more particularly to transmission means utilizing a magnetic fluid including infinitely variable transmission ratio means.

The invention generally comprises a pair of parallel input and output shafts suspended in a magnetic fluid. Each shaft has a coil wound around its axis for the purpose of building up a solid mass or wheel on the shaft through the action of the magnetic field in the magnetic fluid, the size of each wheel being controlled by the amount of current in the particular coil. The solid wheels act in a mechanical manner similar to that of conventional gears. The size of the wheels and therefore the gear ratio is infinitely variable by changing the amount of current in the coils.

More particularly the transmission means of the present invention consists of two parallel shafts separated a finite distance, supported in bearings in a totally enclosed housing of non-magnetic material. Inside the housing the shafts are submerged in magnetically permeable fluid such as is used in magnetic particle clutches. The fluid can be wet or dry. On each shaft is wound a coil, concentric with its shaft and so located that both coils are adjacent each other in physically parallel relation, whose leads are brought out to slip rings and a pair of brushes through which electrical current is supplied from external control circuitry.

When current is passed through one such coil, a magnetic field is generated which permeates the magnetic fluid surrounding the coil. This causes the fluid to congeal around the coil to form a mass whose size and shear strength are a function of the magnitude of current passing through the coil. If the shaft is then rotated, the congealed mass will rotate with it, behaving like a wheel affixed to the shaft. If the coil on the other shaft is similarly excited with electrical current, a similar wheel-like mass forms on it. These two congealed masses react together much the same as two wheels in contact in a friction drive. The shafts are therefore coupled through the interaction of the solidified fluid to provide a transmission means. The speed ratio between the shafts is a function of the relative magnitudes of the coil excitation currents; the power transmission capability of the device is a function of the absolute magnitude of the coil excitation currents. The mechanism of the coupling is either fluid drive or quasi-solid juncture between the masses depending on the relative polarity of the coils.

In another embodiment, to enhance the load capacity of this type infinitely variable ratio transmission, a belt, preferably a toothed belt, such as a "Gilmer Timing Belt" or "Link-Belt Timing Belt" is added inside the housing, which belt circumscribes both shafts in such a manner as to ride on the congealed masses like such a belt would ride on its pulleys in a purely mechanical device. The toothed belt increases the shear area at the effective circumference of each congealed mass thereby increasing the load transmitting capacity of the device over its basic operation described above. In this case, the polarity of the coils must be that which reduces the interaction of the wheel-like masses as the pulley wheel surfaces are moving in opposite directions at the point of closest proximity.

The construction of the shafts and housing involves the use of magnetic and non-magnetic materials in such a way as to confine the magnetic flux from the coils to the volume occupied by the magnetic particle fluid by means well known to those skilled in the art of magnetic circuit design. Besides having a non-magnetic housing, the device would have shafts constructed of combinations of magnetically soft material to form efficient cores for the coils, while the core extensions to form the shafts might preferably be non-magnetic material.

Control of the operating transmission ratio is accomplished by any of a variety of circuit techniques for current variations which are well known to those skilled in electronic arts. The use of this device and the nature of its related electrical control would depend on the specific application requirements.

Accordingly, a principal object of the invention is to provide new and improved power transmission means.

Another object of the invention is to provide new and improved power transmission means having a transmission ratio infinitely variable between finite limits.

Another object of the invention is to provide new and improved magnetic power transmission.

Another object of the invention is to provide new and improved magnetic power transmission means having a transmission ratio infinitely variable between finite limits.

Another object of the invention is to provide new and improved magnetic power transmission means having a transmission ratio infinitely variable between finite limits with automatic means to control the ratio.

Another object of the invention is to provide new and improve dmagnetic transmission means comprising a pair of parallel input and output shafts mounted in a housing and suspended in a magnetic fluid, a pair of coils each wound around the axis of one of said shafts whereby the coils will build up solid wheel-like or gear-like masses which serve to transmit mechanical power from one shaft to the other.

Another object of the invention is to provide new and improved magnetic transmission means comprising a pair of parallel input and output shafts mounted in a housing and suspending in a magnetic fluid, a pair of coils each wound around the axis of one of said shafts whereby the coils will build up solid wheel-like or gear-like masses which serve to transmit mechanical power from one shaft to the other, and additional mechanical means comprising a belt around said shafts and masses, and means to control the current in each of said coils in a predetermined or infinitely variable manner.

These and other objects will be apparent from the following specification and drawings, of which:

FIG. 1 is a side view of an embodiment of the invention.

FIG. 1A is a side sectional view taken along the line A—A of FIG. 1.

FIG. 2 is a detail sectional view of another embodiment of the invention.

FIGS. 3 and 4 are diagrams illustrative of the operation of the invention.

Figure 5:
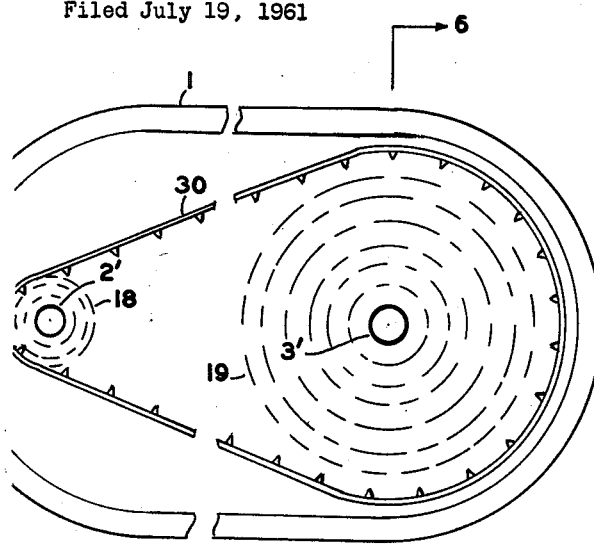
FIG. 5 is a side view of another embodiment of the invention using a belt.

Referring to the figures, FIGS. 1 and 1A show an embodiment of the invention comprising a non-magnetic housing 1 having input and output shafts 2 and 3 rotatably mounted therein. For instance, the shaft 2 is mounted in ball bearings 4 and 5 which are protected by seal rings 6 and 7. Each shaft has a coil 8 wound around its axis for the purpose of creating a magnetic field 10. The coil 8 is energized by a pair of slip rings 12 and 13 which are connected through brushes 12' and 13' to a generator or source 18' of electrical power.

The slip rings are insulated from the shaft by means of the insulating member 15 which is fixedly mounted on the shaft.

The housing 1 contains a magnetic fluid 17 which may comprise motor oil having finely divided iron filings suspended therein. When the magnetic field is passed through the magnetic fluid the fluid will solidify around the shafts and form solid wheels 18 and 19 around the respective input and output shafts. These wheels have a mechanical, shearing, or quasi-solid contact along some common line 20 so that when the input shaft 2 is driven the wheel 18 will rotate, causing the wheel 19 and its shaft 3 to also rotate in the same manner as conventional gearing. The diameters of the magnetic wheels 18 and 19 may be controlled by changing the amount of current through the coils, so that the transmission ratio may be made infinitely variable between finite limits, as shown in FIGS. 3 and 4. The magnetically permeable fluid may be similar to that used in the well known magnetic fluid and magnetic particle clutches. The fluid may be wet with a suitable oil, or dry. The coils may be excited by either A.C. or D.C. electrical power. Operation on D.C. would be superior to that on A.C. but in any case the choice would depend on the particular application.

Parallel conductors 51 and 53 may be embedded in the housing wall to create fields 52 and 54 in opposition to the field 10 at the wall surfaces to minimize mechanical contact between the solid mass and the wall. The conductors 51 and 53 would each extend over one-half of the housing to create maximum compensating fields adjacent each side wall. Conductors 51 terminate in bus 51' and a corresponding bus on the other side, and conductors 53 terminate in bus 53' and a corresponding bus on the other side.

The size of each magnetic wheel is proportional to the current through its coil provided by variable generators 18' and 19'. Therefore, by varying the excitation currents the size of the wheels and the gear ratios may be changed. Also if the two excitation currents are increased in the same proportion the net effect will be to increase the torque transmitting capacity.

FIG. 2 shows a sectional view of another shaft arrangement. In this arrangement the coil 21 is mounted on a stationary shaft 22 inside a hollow shaft 23 which is rotatably mounted in the housing 1 by means of the bearings 24, 25. The rotatable shaft 23 has a pair of flanges 26, 27 of magnetic material which are fixedly mounted thereon. An input or output gear 28 is also fixedly mounted on the rotatable shaft 23. This arrangement eliminates the need for brushes.

The purpose of the flanges is to confine and shape the solid magnetic wheel to the general shape defined by the flanges. This will occur because the magnetic lines of force go through the flanges and from one flange to the other as shown by the arrows. A boundary layer of predominantly magnetically unexcited fluid will result between the outside of the flanges and the inside walls of the housing so as to minimize friction losses against the wall. Such wall friction losses may also be minimized by inserting a magnetic coil in the face of the wall and so arranged as to generate a magnetic field opposing at the wall, the fields generated by the coils on the shafts, in the same manner as coils 51 and 53.

Figure 6:
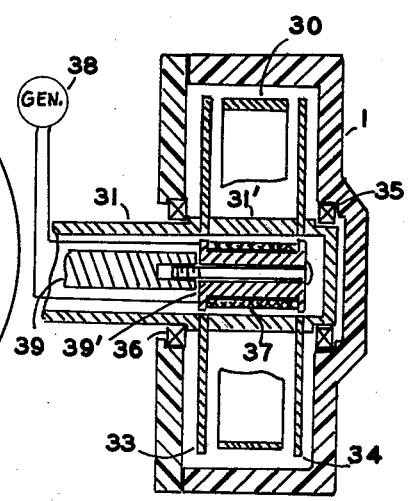
FIG. 6 is a sectional view taken along the lines 6—6 of FIG. 5.

FIGS. 5 and 6 show another embodiment of the invention which is similar to that of FIGS. 1 and 2 except a belt 30 has been added around the magnetic wheel masses 18 and 19 to transmit the power. In this case, both shafts 2' and 3' turn in the same direction so that their surface points of closest proximity are moving in opposite directions. Therefore, the polarity of the coils on shafts 2' and 3' should be such that there will be a minimum of interaction between the wheels themselves. The belt 30 is preferably toothed on the inside for better mechanical gripping. The belt may be made of non-magnetic material but the performance would be enhanced by a belt so impregnated with soft iron particles as to produce permeability for it approximately equal to that of the fluid itself. This increases the shear strength between the wheels and the belt. The belt should not be more permeable than the fluid so as not to short circuit the lines of flux desired to go through the fluid.

FIG. 6 is a sectional view of FIG. 5 showing a rotatable hollow non-magnetic shaft 31, 31', upon which is mounted a reel of magnetic material comprising magnetically soft flanges 33, 34. The shaft 31 is rotatably mounted in the housing 1 by means of the bearings 35, 36. The portion of the shaft 31' in contact with the magnetic fluid may be serrated or roughened for better mechanical contact with the congealed fluid. The coil 37 is mounted on the center axis of the shaft 31 by means of a stationary mandrel 39 to which is mounted a stationary magnetic core 39' which is in a magnetic circuit with flanges 33 and 34. Since the coil 37 is stationary there is no need for slip rings, and the coil may be directly connected to generator 38.

Where the belt drive is used the fluid need not be continuous. In other words, each shaft could be in a separate compartment holding the fluid and the belt could extend through the open air between them. The belt could also be used to connect shafts rotating in opposite directions by imparting a twisted figure eight configuration to the belt.

Figures 7, 7A:
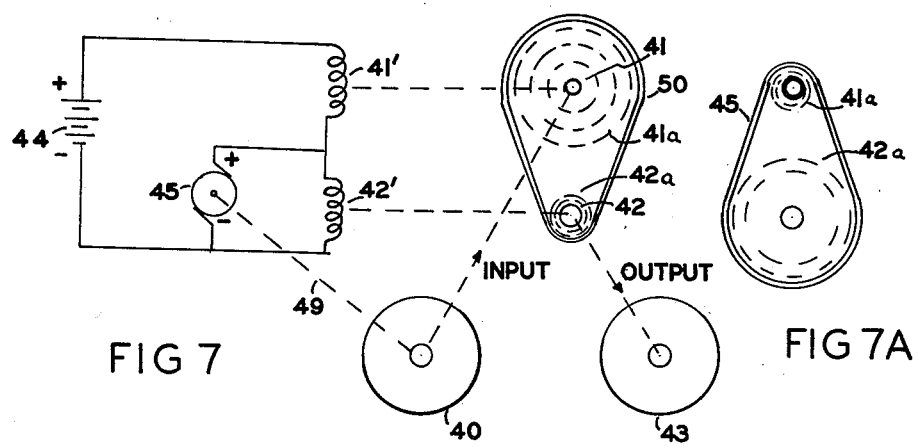
FIGS. 7 and 7A are schematic diagrams including circuit details illustrating one use of the invention.

FIGS. 7 and 7A show an illustrative application of the invention wherein the transmission device of the present invention is adapted to connect an automobile engine 40 to drive an automobile air conditioner 43 at a constant speed. In this application, when the automobile engine is idling at, say, 800 r.p.m., it is necessary to transmit a given number of revolutions per minute, say 2000, to the air conditioner compressor and the speed of the automobile engine is geared up accordingly as shown in FIG. 7. However, when the automobile engine is running very fast, say at 5000 r.p.m., it is necessary to gear down to maintain the given 2000 r.p.m. constant speed of the compressor. This may be done as follows:

The automobile engine 40 is connected to drive the input transmission shaft 41 which has mounted on it the coil 41'. The output transmission shaft 42 is connected to drive the air conditioner 43 and the coil 42' is mounted on the shaft 42. The coils 41' and 42' are connected in series with a battery 44. A D.C. generator 45 is connected from the minus side of the battery to the center connection of the coils 41' and 42'. The shaft 49 of the D.C. generator is connected to the engine 40. As discussed above, the amount of current in the respective coils will vary the size of the solid magnetic wheel 41A, 42A upon which rides the belt 50.

When the engine 40 is running at low speed the generator 45 output will be low, effectively shorting out coil 42', so that the current through the coil 41' will be high compared to that through coil 42', causing the magnetic wheel 41A to be large and the magnetic wheel 42A to be small as illustrated in FIG. 7.

However, when the engine 40 is running fast, then the generator 45 output will be large and it opposes the voltage across the coil 41' so that the current through the coil 41' will be small and the magnetic wheel 41A will be small as illustrated in FIG. 7A. At the same time the voltage of generator 45 will reinforce the voltage across the coil 42' so that the magnetic wheel 42A will be large.

Therefore, it is possible to run the air conditioner compressor 43 at a substantially constant rate with a variable speed input by varying the size of the magnetic wheels and therefore their transmission ratio.

Many modifications may be made by those who desire to practice the invention without departing from the scope thereof which is defined by the following claims.

I claim:
1. Magnetic fluid transmission means comprising a non-magnetic housing, a pair of parallel shafts rotatably mounted in said housing, a pair of electro-magnetic coils, one coil being wound around the axis of one of said shafts and the other coil being would around the other shaft, and a magnetically permeable fluid in said housing.

2. Magnetic fluid transmission means comprising a non-magnetic housing, a pair of parallel shafts rotatably mounted in said housing, a pair of electro-magnetic coils, one coil being wound around the axis of one of said shafts and the other coil being wound around the other shaft, a magnetically permeable fluid in said housing and a continuous belt circumscribing said shafts 3. Apparatus as in claim 2 wherein said belt is toothed.

4. Magnetic fluid transmission means comprising a non-magnetic housing, a pair of parallel shafts rotatably mounted in said housing, a pair of coils, one coil being wound around the axis of one of said shafts and the other coil being wound around the other shaft, a magnetically permeable fluid in said housing means to supply electrical current to each of said coils, and means to control the current in each of said coils.

5. Apparatus as in claim 4 wherein said means to control the current in each of said coils includes means to control the current in each of said coils in a predetermined manner relative each other.

6. Magnetic transmission means comprising a non-magnetic housing, a pair of parallel shafts in said housing, a magnetically permeable fluid in said housing surrounding said shafts, means to drivably connect said shafts comprising means to form adjustable size solid masses around aid shafts, said last means including means to produce a magnetic field around each of said shafts.

7. Magnetic transmission means comprising a non-magnetic housing, a pair of parallel shafts in said housing, a magnetically permeable fluid in said housing surrounding said shafts, means to drivably connect said shafts comprising means to form adjustable size solid masses around said shafts, said last means including means to produce a magnetic field around each of aid shafts, and a coil in said housing wall adapted to create a field at the inner wall surface opposing the field of said masses to minimize mechanical contact between said wheel and said wall.

8. Magnetic fluid transmission means comprising a non-magnetic housing, a pair of parallel shafts having parallel spaced magnetically soft flanges rotatably mounted in said housing, a pair of electro-magnetic coils, one wound around the axis of each of said shafts between said flanges, and a magnetically permeable fluid in each housing.

9. Magnetic fluid transmission means comprising a non-magnetic housing, a pair of parallel shafts having parallel spaced magnetically soft flanges rotatably mounted in said housing, a pair of electro-magnetic coils, one wound around the axis of each of said shafts between said flanges, a magnetically permeable fluid in said housing and a continuous belt between said flanges and circumscribing said coils.

10. Magnetic fluid transmission means comprising a non-magnetic housing, a pair of parallel shafts rotatably mounted in said housing, a pair of series connected coils each wound around the axis of one of said shafts, a source of D.C. voltage connected in series with said coils, a magnetically permeable fluid in each housing and means to control the current in each of said coils in a predetermined manner relative each other comprising a D.C. voltage generator connected across one of said coils in opposing voltage relation to said source of D.C. voltage.

11. Magnetic fluid transmission means comprising a non-magnetic housing, a pair of parallel hollow shafts having parallel spaced magnetically soft flanges rotatably mounted in said housing, an axial electro-magnetic coil in each of said shafts adjacent said flanges, and a magnetically permeable fluid in each housing.

References Cited in the file of this patent
UNITED STATES PATENTS

| | | |
|---|---|---|
| 2,603,103 | Sohon et al. | July 15, 1952 |
| 2,803,968 | Van Tilburg | Aug. 27, 1957 |

FOREIGN PATENTS

| | | |
|---|---|---|
| 17,634 of 1896 | Great Britain | Aug. 10, 1897 |